Patented Nov. 30, 1926.

1,609,005

UNITED STATES PATENT OFFICE.

WILLIAM J. TUCKER, OF WASHINGTON, DISTRICT OF COLUMBIA.

METHOD OF PRESERVING EGGS.

No Drawing.   Application filed March 5, 1926. Serial No. 92,613.

This invention relates to a method of preserving eggs and more particularly to the method disclosed in the prior U. S. Patent #1,302,955, granted May 6, 1919, on an application filed by Ennis M. Nichols and has for one of its objects to improve the method of preserving disclosed therein.

With the above and other objects in view which will appear as the description proceeds, the invention consists in the novel steps and combinations of steps constituting the method, all as will appear more fully below and be pointed out in the appended claims.

In the said prior patent, as well as in the prior copending applications of George H. Benedict, Ser. No. 536,492, filed February 14, 1922, entitled "Apparatus for preserving eggs," and #536,493, filed February 14, 1922, entitled "Egg preserving apparatus" and in the application of George H. Benedict and William J. Tucker, filed February 14, 1922, Ser. No. 536,469, there is disclosed a method of preserving eggs which comprises essentially the immersion of the said eggs in an air excluding liquid such for example as sodium silicate and the repeated turning of the said eggs in the liquid in order to prevent the displacement of the yolks of the eggs from their normally central position, relative to the shell, which positions the said yolks occupy when the egg is laid.

This prior method and the various apparatus disclosed in the said patent and the said copending applications all contemplate however, the turning of the eggs upon an axis corresponding substantially to the longer axis of the egg, or in other words, that the egg shall be rolled upon its side. I have found in actual practice, however, that due to the existence of the air cell in the blunt end of the egg, when it is attempted to rotate the egg about its longer axis in the manner contemplated in the said prior patent and applications, that the buoyant effect of this air cell in the blunt end of the egg when it is submerged in a liquid tends to cause that end of the egg to rise and interfere considerably with the rotating of the egg about the said longer axis.

On the other hand, I have found from actual experiments that if the turning movement is accomplished by rotating or oscillating the egg in the plane in which it naturally tends to turn i. e., the plane of its longer axis, that substantially all of the difficulties encountered in prior methods are overcome. In other words, due to the existence of the air cell in the blunt end of the egg, the natural tendency of the egg when submerged in a liquid is to stand upon its smaller end with the air cell up. The amount of air contained in the air cell, however, is not ordinarily sufficient to cause the egg to stand completely on end when submerged in a liquid although there is a marked tendency when it is attempted to roll the egg sidewise in the liquid for this blunt end to rise.

On the other hand, if the turning movement is accomplished in such a manner as to take advantage of this natural tendency of the egg when submerged in a liquid, much more efficient results may be accomplished inasmuch as the eggs will not cant or turn sidewise in the trays and in some instances become wedged therein so that they will fail to turn, as has been found to be the case when operating in accordance with the disclosure of the said prior patent.

My invention therefore, comprises the turning of the eggs in the air excluding liquid substantially in the plane of their longer axes, as distinguished from the method heretofore employed of rotating the eggs about the longer axes. The method may be conveniently carried out by placing the eggs in a suitable container filled with sodium silicate or other air excluding liquid, the eggs resting upon platforms or shelves and being maintained spaced from one another by frames or trays providing individual cells. The said shelves may be moved relative to the frames, or the frames may be moved relative to the shelves, in such direction as to cause the eggs, through their frictional engagement with said shelves, to be turned in substantially the planes of their longer axes.

Obviously, numerous forms of apparatus may be devised for accomplishing this purpose and in fact, the apparatus disclosed and claimed in the said Nichols patent may be readily adapted for carrying out the present process by merely changing the spacing of the longitudinal and transverse rods or partitions of the trays or frames disclosed therein, so that the eggs will rest with their longitudinal axes parallel to the plane of movement of the trays within the containers instead of said longer axes being transverse to the said plane of movement. Likewise the apparatus shown in the said copending application might be easily and readily adapted to the present method by obvious changes which would come within the skill of an ordinary mechanic. It is, therefore, not wished to be limited to any particular form of apparatus for carrying out the present method.

Having thus described the invention, what I claim as new is:—

1. The method of preserving eggs which consists in submerging said eggs in a liquid; and turning said eggs in said liquid in substantially the planes of their longer axes.

2. The method of preserving eggs which consists in submerging said eggs in an air excluding liquid; and turning said eggs in said liquid in substantially the planes of their longer axes, said eggs turning or pivoting about their smaller ends.

3. The method of preserving eggs which consists in submerging said eggs in a liquid, in engagement with a surface; and moving the surface or eggs, the one relative to the other, in a direction to cause said eggs, through frictional contact with said surface, to turn in substantially the planes of their longitudinal axes.

In testimony whereof I affix my signature.

WILLIAM J. TUCKER.